(12) United States Patent
Bauters et al.

(10) Patent No.: US 9,366,819 B1
(45) Date of Patent: Jun. 14, 2016

(54) REDUCED CROSSTALK FOR BI-DIRECTIONAL ARRAYED WAVEGUIDE GRATINGS

(71) Applicant: Aurrion, Inc., Goleta, CA (US)

(72) Inventors: Jared Bauters, Santa Barbara, CA (US); Jonathan Edgar Roth, Santa Barbara, CA (US); Anand Ramaswamy, Goleta, CA (US)

(73) Assignee: Aurrion, Inc., Goleta, CA (US)

( * ) Notice: Subject to any disclaimer, the term of this patent is extended or adjusted under 35 U.S.C. 154(b) by 39 days.

(21) Appl. No.: 14/537,575

(22) Filed: Nov. 10, 2014

Related U.S. Application Data

(60) Provisional application No. 61/936,182, filed on Feb. 5, 2014.

(51) Int. Cl.
  *H04B 10/67* (2013.01)
  *H04J 14/02* (2006.01)
  *G02B 6/28* (2006.01)
  *G02B 6/34* (2006.01)

(52) U.S. Cl.
  CPC .. *G02B 6/28* (2013.01); *G02B 6/34* (2013.01); *H04J 14/02* (2013.01); *H04B 10/67* (2013.01)

(58) Field of Classification Search
  None
  See application file for complete search history.

(56) References Cited

U.S. PATENT DOCUMENTS

| 2002/0081062 A1* | 6/2002 | He | G02B 6/12016 385/24 |
| 2005/0157984 A1* | 7/2005 | Han | G02B 6/12014 385/47 |
| 2007/0065076 A1* | 3/2007 | Grek | G02B 6/12026 385/37 |

* cited by examiner

*Primary Examiner* — Darren E Wolf
(74) *Attorney, Agent, or Firm* — Schwegman Lundberg & Woessner, P.A.

(57) ABSTRACT

Embodiments describe bi-directional AWGs comprising a first input waveguide coupled to a first free propagation region to input light into a dispersive waveguide array, a second input waveguide coupled to a second free propagation region to input light into the dispersive waveguide array, a first plurality of output waveguides coupled to the first free propagation region to output light from the dispersive waveguide array received from the second input waveguide, and a second plurality of output waveguides coupled to the second free propagation region to output light from the dispersive waveguide array received from the first input waveguide. At least one of these FPRs reduces potential crosstalk received at their respective output waveguides by having at least one of their input waveguides or plurality of output waveguides angled offset from a center of the dispersive waveguide array to attenuate carrier waves that can be present at the output waveguides.

20 Claims, 7 Drawing Sheets

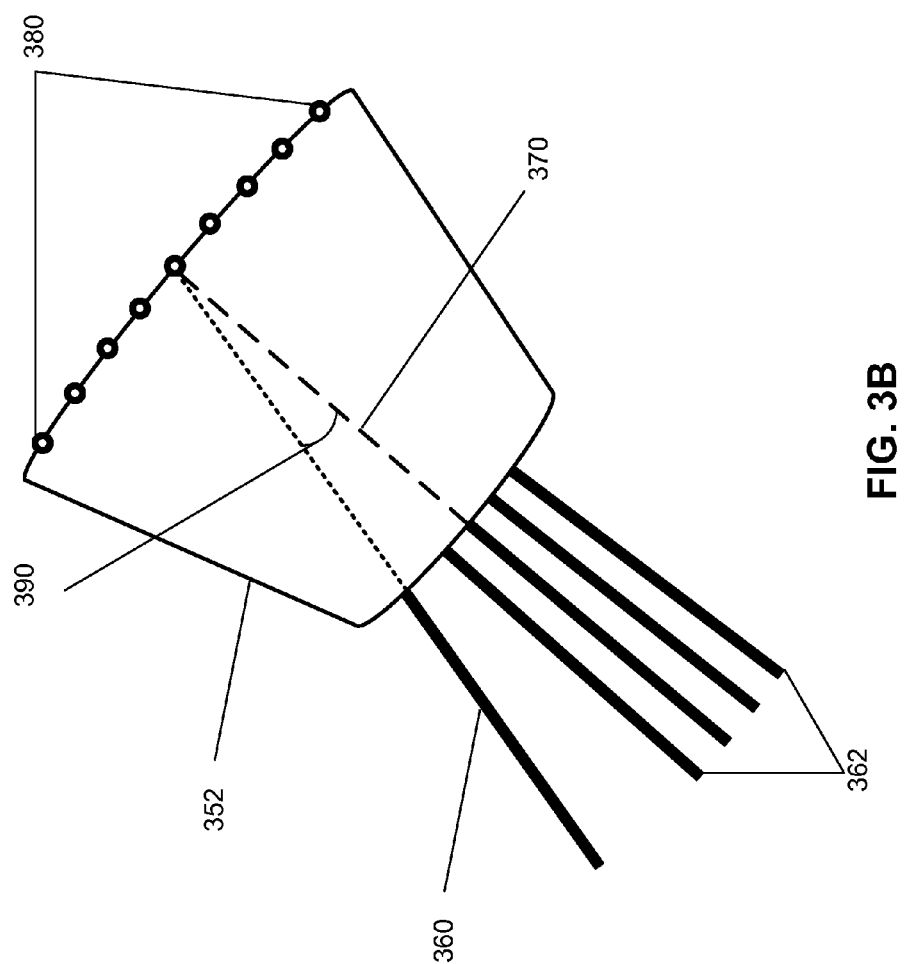

REDUCED CROSSTALK FOR BI-DIRECTIONAL ARRAYED WAVEGUIDE GRATINGS

PRIORITY

This application claims the benefit of U.S. Provisional Application No. 61/936,182 filed Feb. 5, 2014, the entire contents of which are hereby incorporated by reference herein.

FIELD

Embodiments of the disclosure generally pertain to the optical devices and more specifically to reducing potential crosstalk for arrayed waveguide gratings (AWGs).

BACKGROUND

For optical transmitting and receiving devices, a plurality of signals can be combined to be simultaneously transmitted or received over a shared medium. Multiplexing and de-multiplexing functions can be used for combining and separating individual signals for routing and/or interfacing with individual optical components.

An arrayed waveguide grating (AWG) is an optical component used to perform multiplexing and de-multiplexing functions for optical signals. An AWG typically includes one or more free propagation regions coupled to a dispersive waveguide array having varying lengths; these varying lengths are selected to result in appropriate constructive and destructive interference for light of certain frequencies transmitted from the free propagation regions, resulting in the combination or separation of optical signals. It is important to prevent noise having these same frequencies from passing through an AWG with low insertion loss, in order to eliminate this noise from being introduced into other components of an optical system.

BRIEF DESCRIPTION OF THE DRAWINGS

The following description includes discussion of figures having illustrations given by way of example of implementations of embodiments of the disclosure. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive

FIG. 3A and FIG. 3B are illustrations of free propagation regions for arrayed waveguide gratings according to embodiments of the disclosure.

Descriptions of certain details and implementations follow, including a description of the figures, which can depict some or all of the embodiments described below, as well as discussing other potential embodiments or implementations of the inventive concepts presented herein. An overview of embodiments of the disclosure is provided below, followed by a more detailed description with reference to the drawings.

DESCRIPTION

Embodiments of the disclosure describe designs for reducing potential crosstalk for bi-directional arrayed waveguide gratings (AWGs). Throughout this specification, several terms of art are used. These terms are to take on their ordinary meaning in the art from which they come, unless specifically defined herein or the context of their use would clearly suggest otherwise. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Figure 1:
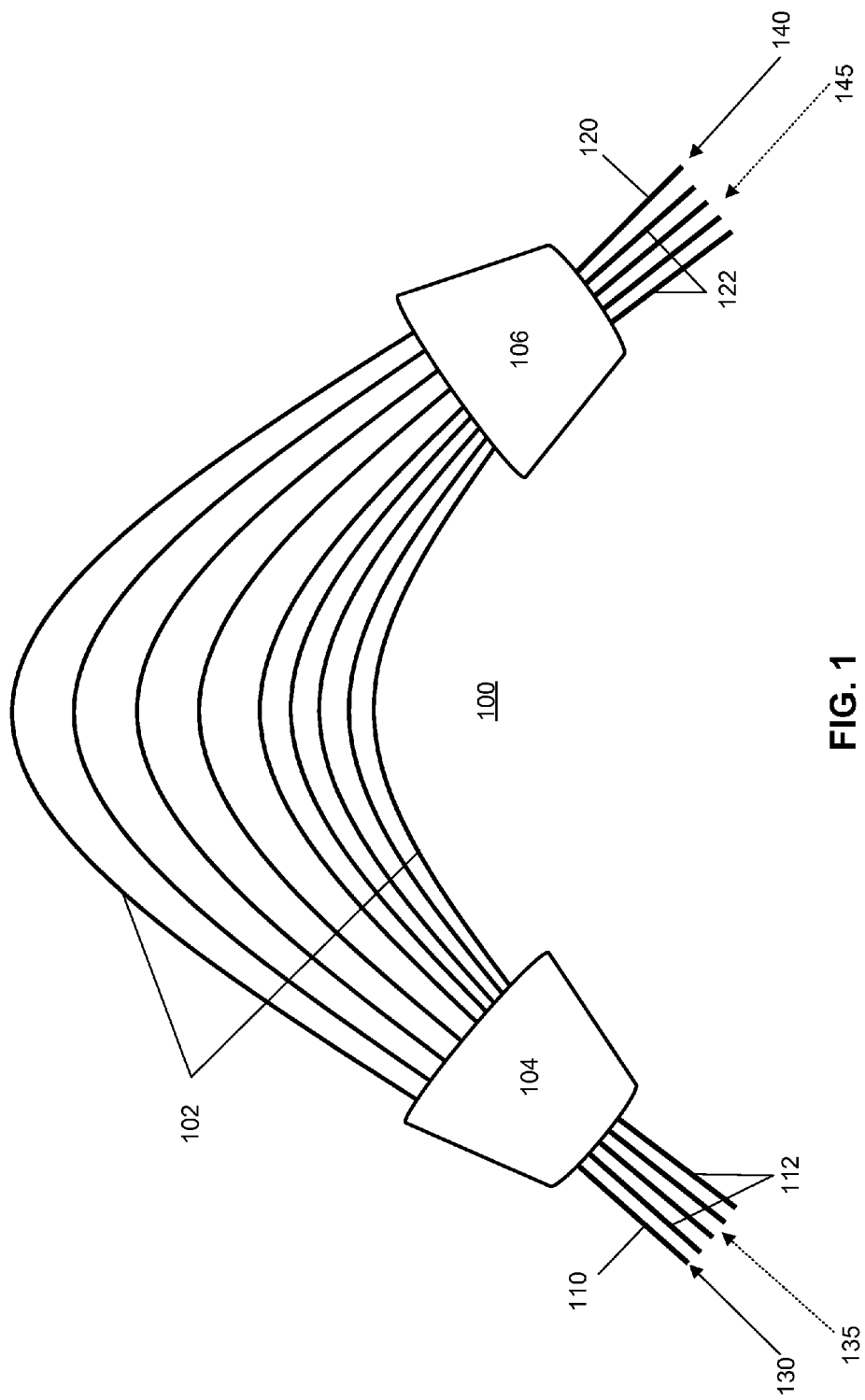
FIG. 1 is an illustration of a bi-directional arrayed waveguide grating according to an embodiment of the disclosure.

FIG. 1 is an illustration of a bi-directional AWG according to an embodiment of the disclosure. It is appreciated, for FIG. 1 and the remaining illustrations discussed below, that the figures provided are for explanation purposes to persons ordinarily skilled in the art and that the drawings are not necessarily drawn to scale. It is to be understood that the various regions, layers and structures of figures can vary in size, dimensions, and spacings.

In this embodiment, AWG 100 is shown to include dispersive waveguide array 102 coupling free propagation regions (FPRs) 104 and 106. AWG 100 is shown to have two sets of input/output waveguides—input waveguides 110 and 120 (to receive light 130 and 140, respectively), and output waveguide sets 112 and 122 (to output specific wavelengths of light 140 and 130, respectively).

The various lengths of dispersive waveguide array 102 can be selected to result in appropriate constructive and destructive interference such that input signals 130 and 140 received at input waveguides 110 and 120, respectively, can be spatially spread out by the interference pattern; this interference patterns results in smaller wavelength ranges being separated (i.e., de-multiplexed) and output via waveguide sets 122 and 112, respectively. Similarly, the transmission of light in the opposite direction (i.e., via output waveguide sets 122 and 112) can result in the output of a combined (i.e., multiplexed) multi-wavelength optical signal via waveguides 110 and 120.

Thus, the terms "input" and "output" waveguides are merely used to describe said waveguides in an exemplary de-multiplexing use, and should not be read as to limit the function of AWG 100. In other words, input waveguides 110 and 120 can be limited to receiving light based on the architecture incorporating AWG 100, and similarly output waveguide sets 112 and 122 can be limited to transmitting light based on the architecture incorporating the AWG, but such limitations are not the result of the design of the AWG itself.

Optical signal noise 135 and 145 are carrier waves not purposefully generated by an optical system to be received by AWG 100; these carrier waves can be present for any reason common causes for this noise include back reflections from other optical devices coupled to the AWG, unabsorbed light from other optical devices coupled to the AWG, etc. Reducing the size of an optical system and sharing optical devices within the system (e.g., in a photonic integrated circuit (PIC) implementation of an optical system design) increases the likelihood that this type of crosstalk can occur, as the various photonic circuits, devices, and channels are disposed in a relatively confined area.

If optical signal noise 135 comprises signals within the functional range of output waveguides 112 and FPR 104, dispersive waveguide array 102 can process this noise to be output via waveguide 120 or any of waveguides 122; similarly, if optical signal noise 145 comprises signals within the functional range of output waveguides 122 and FPR 106, dispersive waveguide array 102 can process this noise to be output via waveguide 110 or any of waveguides 112. It is desirable for carrier waves 135 to not be routed to any of waveguides 120 and 122, and for carrier waves 145 to not be routed to any of waveguides 110 and 112, so that they do not contribute to crosstalk on various frequency channels.

Figure 2:
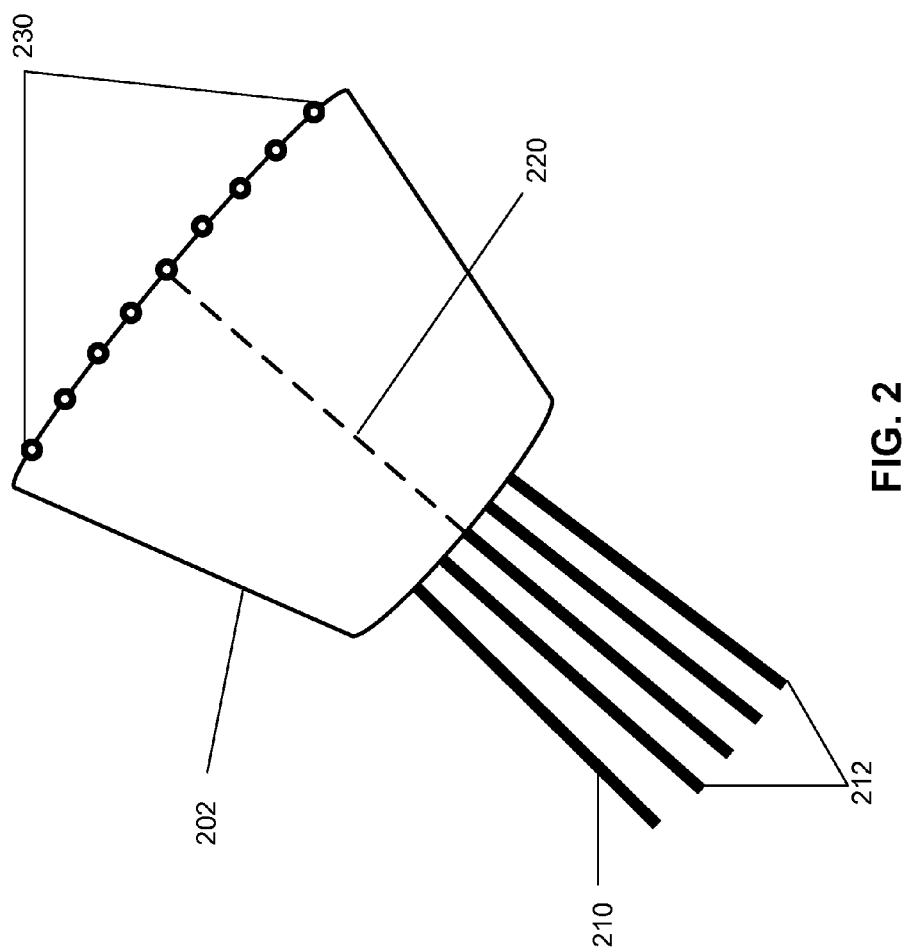
FIG. 2 is an illustration of a free propagation region of an arrayed waveguide grating according to an embodiment of the disclosure.

FIG. 2 is an illustration of an FPR of an AWG according to an embodiment of the disclosure. FPR 202 is shown to optically couple input waveguide 210 and output waveguide set 212 to dispersive waveguide array 230. The operation on an FPR in an AWG is known in the art. FPR 202 is designed such that light received by the FPR from dispersive waveguide array 230 undergoes constructive/destructive interference to direct each wavelength of a channel of light to one of output waveguide set 212; light received by the FPR from input waveguide 210 similarly is coupled to the dispersive waveguide array 230, such that different wavelengths composing the light can undergo constructive/destructive interference and be focused at different output waveguides at the opposite end of waveguide array 230, depending on the wavelength).

While the waveguides of waveguide set 212 are described in this embodiment as "output" waveguides, carrier waves present at these waveguides can be routed to dispersive waveguide array 230, and subsequently output from the input and output waveguides at the opposite end of the dispersive waveguide array. These carrier waves, if output from the AWG, would contribute to the noise floor of the optical system incorporating the AWG.

In addition to the waveguide length of dispersive waveguide array 230, the angle placement of output waveguides 212 within FPR 202 determines where a carrier wave incident on one of those waveguides is routed. In this embodiment, line 220 is shown to illustrate the center of FPR 202—in this example, the center waveguide of dispersive waveguide array 230; other embodiments can define the center of the FPR differently—e.g., as the center curvature of the FPR surface coupled to the dispersive waveguide array. Current solutions typically align waveguides 210 and 212, together as a group, with center line 220. As described in embodiments below, if the range of carrier waves frequencies that can be incident on output waveguides 212 are known, the angle of either the output waveguides or input waveguide 210 can be chosen such that these frequencies are imaged away from the input and output waveguides at the opposite end of dispersive waveguide array 230.

Figure 3A:
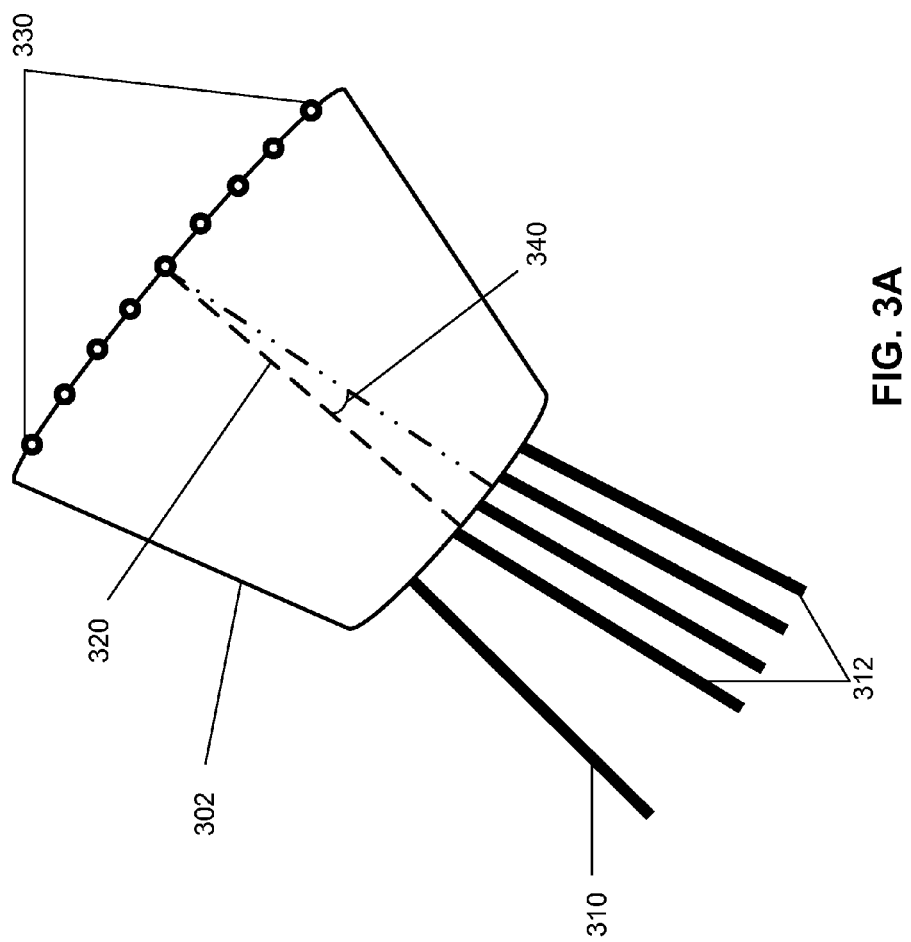

FIG. 3A and FIG. 3B are illustrations of free propagation regions for AWGs according to embodiments of the disclosure. FIG. 3A illustrates FPR 302 optically coupling input waveguide 310 and output waveguide set 312 to dispersive waveguide array 330. In this embodiment, output waveguides 312 are shown to be offset from the center for FPR 302 (i.e., center line 320) at angle 340. This angle is selected, in part, so that any of output waveguides 312 do not overlap input waveguide 310. This angle is further selected based on the optical signal noise that can be present at waveguides 312 during operation of the AWG incorporating FPR 302. In some embodiments, an angle between input waveguide 310 in FPR 302 and a closest output waveguide from waveguide set 312 is larger than an angle between any two output waveguides from output waveguide set 312 within the FPR.

Angle 340 is selected so that any expected noise can be sufficiently attenuated prior to reaching the input and output waveguides at the opposite end of dispersive waveguide array 330. FIG. 3B illustrates FPR 352 optically coupling input waveguide 360 and output waveguide set 362 to dispersive waveguide array 380. In this embodiment, input waveguide 360 is shown to be offset from the center for FPR 352 (i.e., center line 370) at angle 390. This angle is selected, in part, so that input waveguide 360 does not overlap with any of output waveguides 362. This angle is further selected based on the optical signal noise that can be present at waveguides 362 during operation of the AWG incorporating FPR 352. In some embodiments, an angle between input waveguide 360 in FPR 352 and a closest output waveguide from waveguide set 362 is larger than an angle between any two output waveguides from output waveguide set 362 within the FPR.

Thus, embodiments of the disclosure can utilize FPRs having at least one of the input waveguide or the plurality of output waveguides angled at an offset from the center of the FPR. In some embodiments, both the input waveguide and the output waveguides of an FPR are angled at an offset from the center waveguide of the dispersive waveguide array. The selection of the angle offset, and which waveguides are to be offset from the center of the FPR, is based, in part, on the channel spacing of the respective dispersive waveguide array, and the expected carrier waves that can be present on the output waveguides. These FPRs can have an increased size due to the offset angle of the input waveguide and/or the output waveguides.

Figure 4:
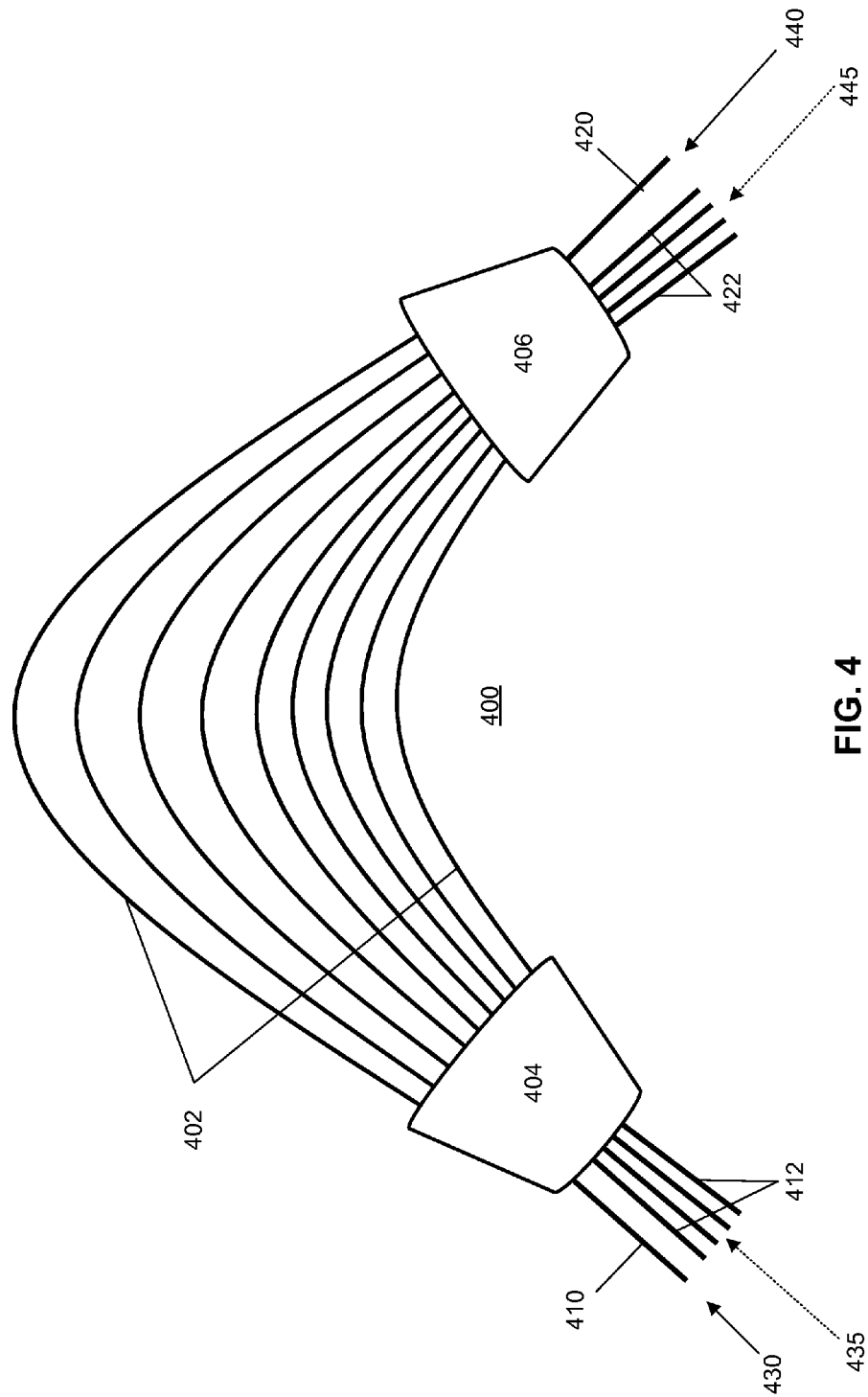
FIG. 4 is an illustration of a bi-directional arrayed waveguide grating according to an embodiment of the disclosure.

FIG. 4 is an illustration of a bi-directional AWG according to an embodiment of the disclosure. In this embodiment, AWG 400 is shown to include dispersive waveguide array 402 coupling FPRs 404 and 406. The spacing of the waveguides of dispersive waveguide array 402 at FPR 404 and FPR 406 can be equal, or can be different at each FPR. AWG 400 is shown to have two sets of input/output waveguides—input waveguides 410 and 420 (to receive light 430 and 440, respectively), and output waveguide sets 412 and 422 (to output specific wavelengths of light 440 and 430, respectively). The spacing of the input and output waveguides can be equal, or can be different. In some embodiments, a free spectral range of dispersive waveguide array 402 is greater than a frequency spacing between individual wavelength channels to be separated at the output multiplied by the total number of input and output waveguides connected to one of the FPRs. In some embodiments, an angle between input waveguide 410 and the center of dispersive waveguide array 402 at FPR 404 is not equal to an angle between input waveguide 420 and the center of the dispersive waveguide array at FPR 406 (or vice versa). In some embodiments, the difference in angles between input waveguide 410 and the center of dispersive waveguide array 402 at FPR 404 and input waveguide 420 and the center of the dispersive waveguide array at FPR 406 is equal to half the angle between any two adjacent output waveguides of output waveguides 412 and 422.

Optical signal noise 435 and 445 are optical signals not purposefully generated by the optical system including AWG 400. In this embodiment, if optical signal noise 435 comprises carrier waves present at output waveguides 412, this noise is not output via waveguide 420 or any of waveguides 422, due to the angled offset of at least one waveguides 410 or waveguide set 412 at FPR 40 (i.e., angled offset from the center of FPR 404). This angled offset causes high attenuation for optical signal noise 435, so that minimal (if any) noise is output via waveguides 420 or waveguide set 422. For example, an angle at which light is diffracted between input waveguide 410 and output waveguides 422 and an angle between input waveguide 420 and output waveguides 412 can each be chosen such that when the wrong wavelength enters an output port (e.g. one of output waveguides 422), it is imaged onto a point at the FPR at the opposite side (e.g., FPR 406) along the edge where input and output waveguides intersect the FPR, but at a location where no input or output waveguide is centered.

Similarly, if optical signal noise 445 comprises carrier waves present at output waveguides 422, this noise is not output via waveguide 410 and any of waveguides 412 due to the angled offset of at least one waveguides 420 or waveguide set 422 at FPR 406 (i.e., angled offset from the center of FPR 406).

AWGs according to embodiments of the disclosure can be actively or passively athermal to improve upon the predictability of the operation of the AWG, and thereby increasing the reliability of the above described angled offsets to reduce the presence of crosstalk. Finite impulse response (FIR) filters are commonly implemented in AWGs. Athermicity of an FIR filter describes maintaining a consistent frequency transmission spectrum as the ambient temperature changes. A tunable spectral response for an FIR filter describes changing the spectrum of an FIR filter based on its application, as well as potentially correcting for fabrication deviations from the design. In some embodiments of, athermal operation of an FIR filter of an AWG is obtained via active control by heating a region of the filter. In some embodiments, devices are designed to have waveguide regions having different thermo-optic coefficients (alternatively referred to herein as 'dn/dT'), either from differing materials or differing waveguide cross-sections, wherein a region where waveguides have a high dn/dT can be heated, while the remaining bulk of the FIR device uses waveguides with a low dn/dT. Other athermal solutions can be utilized.

Figure 5:
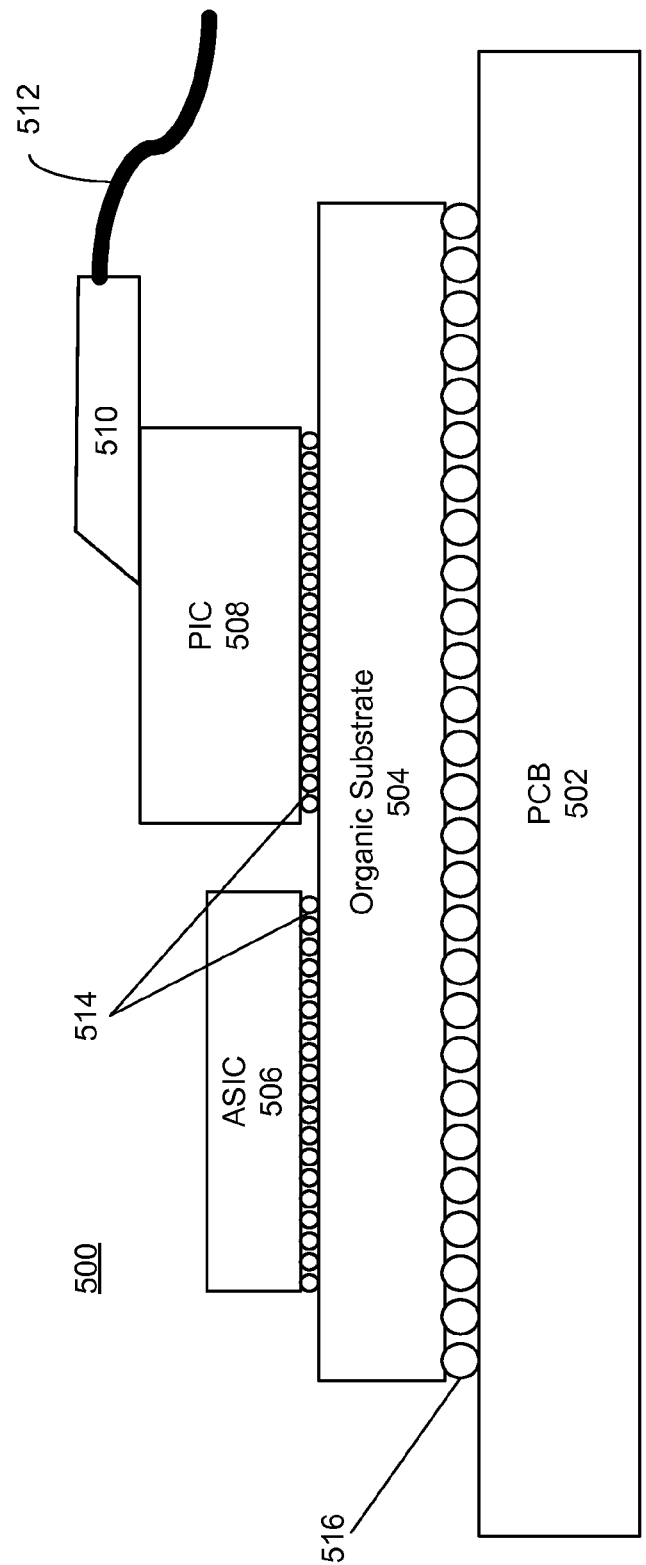
FIG. 5 is an illustration of a system including bi-directional arrayed waveguide gratings according to an embodiment of the disclosure.

FIG. 5 is an illustration of a system including bi-directional AWGs according to an embodiment of the disclosure. In this embodiment, system 500 is shown to include printed circuit board (PCB) substrate 502, organic substrate 504, application specific integrated circuit (ASIC) 506, and PIC 508. In this embodiment, PIC 508 can include one or more bi-directional AWGs described above—i.e., AWGs having low crosstalk contributed from signals that can enter any of the "output" waveguides, as described above. PIC 508 exchanges light with fiber 512 via prism 510; said prism is a misalignment-tolerant device used to couple an optical mode on to a single mode optical fiber. The optical devices of PIC 508 are controlled, at least in part, by control circuitry included in ASIC 506.

Both ASIC 506 and PIC 508 are shown to be disposed on copper pillars 514, which are used for communicatively coupling the ICs via organic substrate 504. PCB 508 is coupled to organic substrate 504 via ball grid array (BGA) interconnect 516, and can be used to interconnect the organic substrate (and thus, ASIC 506 and PIC 508) to other components of system 500 not shown—e.g., interconnection modules, power supplies, etc.

Figure 6:
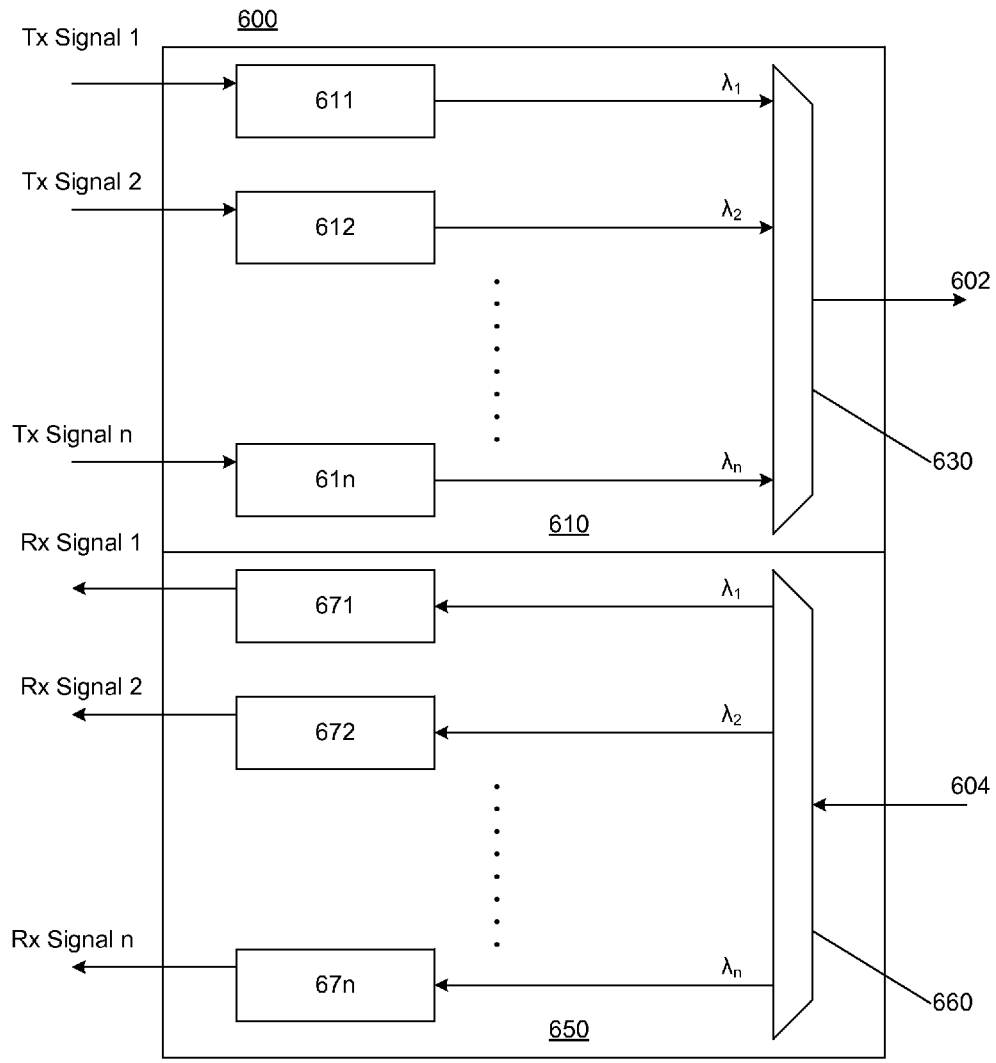
FIG. 6 illustrates a tunable multi-wavelength optical transceiver to utilize one or more bi-directional arrayed waveguide gratings according to an embodiment of the disclosure.

FIG. 6 illustrates a tunable multi-wavelength optical transceiver to utilize one or more bi-directional AWGs according to an embodiment of the disclosure. In this embodiment, transceiver 600 includes transmitter module 610 for generating output WDM signal 602 having n different WDM wavelengths. These different WDM wavelengths can be based, for example, on, the L, C and S bands for WDM applications. Transmitter module 600 includes tunable laser modules 611-61$n$ to generate light, which can be further modulated based on transmission signal data. Said laser modules and modulators can be integrated or discrete components (not shown). Multiplexer 630 is shown to receive n modulated signals and outputs WDM output signal 602 that comprises multiple output channels within a WDM spectral band.

Transceiver 600 further includes receiver module 650 including de-multiplexer 660 to receive WDM input signal 604 and output the received signal at different WDM wavelengths along n different optical paths. It is to be understood that in other embodiments, transmitter module 610 and receiver module 650 can be included in separate devices (i.e., a separate transmitter and receiver). In this embodiment, optical detectors 671-67$n$ are included in the n optical paths and convert the de-multiplexed signals of WDM input signal 604 into n reception data signals for further processing.

In this embodiment, multiplexer 630 and de-multiplexer 660 can comprise any of bi-directional AWGs described above, thereby eliminating or reducing noise-related errors that can occur during the operation of transceiver 600. Thus, transceiver 600 can include at least one of the bi-directional AWGs described above for use by any combination of transmitter module 610 and/or receiver module 650.

Reference throughout the foregoing specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout the specification are not necessarily all referring to the same embodiment. Furthermore, the particular features, structures or characteristics can be combined in any suitable manner in one or more embodiments. In addition, it is appreciated that the figures provided are for explanation purposes to persons ordinarily skilled in the art and that the drawings are not necessarily drawn to scale. It is to be understood that the various regions, layers and structures of figures can vary in size and dimensions.

The above described embodiments of the disclosure can comprise SOI or silicon based (e.g., silicon nitride (SiN)) devices, or can comprise devices formed from both silicon and a non-silicon material. Said non-silicon material (alternatively referred to as "heterogeneous material") can comprise one of III-V material, magneto-optic material, or crystal substrate material.

III-V semiconductors have elements that are found in group III and group V of the periodic table (e.g., Indium Gallium Arsenide Phosphide (InGaAsP), Gallium Indium Arsenide Nitride (GaInAsN)). The carrier dispersion effects of III-V based materials can be significantly higher than in silicon based materials, as electron speed in III-V semiconductors is much faster than that in silicon. In addition, III-V materials have a direct bandgap which enables efficient creation of light from electrical pumping. Thus, III-V semiconductor materials enable photonic operations with an increased efficiency over silicon for both generating light and modulating the refractive index of light.

Thus, III-V semiconductor materials enable photonic operation with an increased efficiency at generating light from electricity and converting light back into electricity. The low optical loss and high quality oxides of silicon are thus combined with the electro-optic efficiency of III-V semiconductors in the heterogeneous optical devices described below; in embodiments of the disclosure, said heterogeneous devices utilize low loss heterogeneous optical waveguide transitions between the devices' heterogeneous and silicon-only waveguides.

Magneto-optic materials allow heterogeneous PICs to operate based on the magneto-optic (MO) effect. Such devices can utilize the Faraday Effect, in which the magnetic field associated with an electrical signal modulates an optical beam, offering high bandwidth modulation, and rotates the electric field of the optical mode enabling optical isolators. Said magneto-optic materials can comprise, for example, materials such as such as iron, cobalt, or yttrium iron garnet (YIG).

Crystal substrate materials provide heterogeneous PICs with a high electro-mechanical coupling, linear electro optic coefficient, low transmission loss, and stable physical and chemical properties. Said crystal substrate materials can comprise, for example, lithium niobate (LiNbO3) or lithium tantalate (LiTaO3).

Embodiments of the disclosure describe a bi-directional arrayed waveguide grating (AWG) comprising a first free propagation region, a second free propagation region, a dispersive waveguide array optically coupling the first and second free propagation regions, a first input waveguide coupled to the first free propagation region to input light into the dispersive waveguide array, a second input waveguide coupled to the second free propagation region to input light into the dispersive waveguide array, a first plurality of output waveguides coupled to the first free propagation region to output light from the dispersive waveguide array received from the second input waveguide, and a second plurality of output waveguides coupled to the second free propagation region to output light from the dispersive waveguide array received from the first input waveguide. An angle between the first input waveguide in the first free propagation region and a closest output waveguide is larger than an angle between any two output waveguides within the first free propagation region in some embodiments.

In some embodiments, an angle between the second input waveguide in the second free propagation region and a closest output waveguide is larger than an angle between any two output waveguides within the first free propagation region.

In some embodiments, the dispersive waveguide array is formed, at least partially, from silicon semiconductor material. In some embodiments, the dispersive waveguide array is formed, at least partially, from III-V semiconductor material. In some embodiments, the dispersive waveguide array is formed, at least partially, from silicon nitride (SiN) material. In some embodiments, the dispersive waveguide array comprises a plurality of regions having a different temperature coefficient of refractive index (dn/dT).

In some embodiments, a spacing of the first plurality of waveguides at the first propagation region and a spacing of the second plurality of waveguides at the second propagation region are equal.

In some embodiments, a free spectral range of the dispersive waveguide array is greater than a frequency spacing between individual wavelength channels to be separated at the output multiplied by the total number of input and output waveguides connected to the first FPR.

In some embodiments, an angle between the first input waveguide and the center of the dispersive waveguide array at the first propagation region is not equal to an angle between the second input waveguide and the center of the dispersive waveguide array at the second propagation region.

In some embodiments, the difference in angles between the first input waveguide and the center of the dispersive waveguide array at the first propagation region and the second input waveguide and the center of the dispersive waveguide array at the second propagation region is equal to half the angle between two adjacent output waveguides of the first and second plurality of output waveguides.

Embodiments of the disclosure describe a wavelength division multiplexed (WDM) device comprising at least one of: a transmission component comprising an array of laser modules to produce light having different optical WDM wavelengths onto a plurality of optical paths, and a multiplexer having a plurality of inputs to receive light from each of the plurality of optical paths and to output an output WDM signal comprising the different optical WDM wavelengths; or a receiving component comprising a de-multiplexer to receive an input WDM signal comprising the different optical WDM wavelengths and to output each of the different WDM wavelengths on a separate optical path.

The at least one of the transmission component or the receiving component includes a bi-directional arrayed waveguide grating (AWG) comprising: a first free propagation region, a second free propagation region, a dispersive waveguide array optically coupling the first and second free propagation regions, a first input waveguide coupled to the first free propagation region to input light into the dispersive waveguide array, a second input waveguide coupled to the second free propagation region to input light into the dispersive waveguide array, a first plurality of output waveguides coupled to the first free propagation region to output light from the dispersive waveguide array received from the first input waveguide, and a second plurality of output waveguides coupled to the second free propagation region to output light from the dispersive waveguide array received from the second input waveguide. An angle between the first input waveguide in the first free propagation region and a closest output waveguide is larger than an angle between any two output waveguides within the first free propagation region. In some embodiments, the transmission component and the receiving component can same the same bi-directional AWG.

In some embodiments, an angle between the second input waveguide in the second free propagation region and a closest output waveguide is larger than an angle between any two output waveguides within the first free propagation region.

In some embodiments, the dispersive waveguide array of the bi-directional AWG is formed, at least partially, from silicon semiconductor material. In some embodiments, the dispersive waveguide array of the bi-directional AWG is formed, at least partially, from III-V semiconductor material. In some embodiments, the dispersive waveguide array of the bi-directional AWG is formed, at least partially, from silicon nitride (SiN) material. In some embodiments, the dispersive waveguide array of the bi-directional AWG comprises a plurality of regions having a different temperature coefficient of refractive index (dn/dT).

In some embodiments, a spacing of the first plurality of waveguides of the bi-directional AWG at the first propagation region and a spacing of the second plurality of waveguides at the second propagation region are equal.

In some embodiments, a free spectral range of the dispersive waveguide array of the bi-directional AWG is greater than a frequency spacing between individual wavelength channels to be separated at the output multiplied by the total number of input and output waveguides connected to the first FPR.

In some embodiments, an angle between the first input waveguide and the center of the dispersive waveguide array of the bi-directional AWG at the first propagation region is not equal to an angle between the second input waveguide and the center of the dispersive waveguide array at the second propagation region.

In some embodiments, the difference in angles between the first input waveguide and the center of the dispersive waveguide array of the bi-directional AWG at the first propagation region and the second input waveguide and the center of the dispersive waveguide array at the second propagation region is equal to half the angle between two adjacent output waveguides of the first and second plurality of output waveguides.

In the foregoing detailed description, the method and apparatus of the present invention have been described with reference to specific exemplary embodiments thereof. It will, however, be evident that various modifications and changes can be made thereto without departing from the broader spirit and scope of the present invention. The present specification and figures are accordingly to be regarded as illustrative rather than restrictive.

The invention claimed is:

1. A bi-directional arrayed waveguide grating (AWG) comprising:
   a first free propagation region;
   a second free propagation region;
   a dispersive waveguide array optically coupling the first and second free propagation regions;
   a first input waveguide coupled to the first free propagation region to input light into the dispersive waveguide array;
   a second input waveguide coupled to the second free propagation region to input light into the dispersive waveguide array;
   a first plurality of output waveguides coupled to the first free propagation region to output light from the dispersive waveguide array received from the second input waveguide; and
   a second plurality of output waveguides coupled to the second free propagation region to output light from the dispersive waveguide array received from the first input waveguide;
   wherein an angle between the first input waveguide in the first free propagation region and a closest output waveguide is larger than an angle between any two output waveguides within the first free propagation region.

2. The bi-directional AWG of claim 1, wherein an angle between the second input waveguide in the second free propagation region and a closest output waveguide is larger than an angle between any two output waveguides within the first free propagation region.

3. The bi-directional AWG of claim 1, wherein the dispersive waveguide array is formed, at least partially, from silicon semiconductor material.

4. The bi-directional AWG of claim 1, wherein the dispersive waveguide array is formed, at least partially, from III-V semiconductor material.

5. The bi-directional AWG of claim 1, wherein the dispersive waveguide array is formed, at least partially, from silicon nitride (SiN) material.

6. The bi-directional AWG of claim 1, wherein the dispersive waveguide array comprises a plurality of regions having a different temperature coefficient of refractive index (dn/dT).

7. The bi-directional AWG of claim 1, wherein a spacing of the first plurality of waveguides at the first propagation region and a spacing of the second plurality of waveguides at the second propagation region are equal.

8. The bi-directional AWG of claim 1, wherein a free spectral range of the dispersive waveguide array is greater than a frequency spacing between individual wavelength channels to be separated at the output multiplied by the total number of input and output waveguides connected to the first free propagation region.

9. The bi-directional AWG of claim 1, wherein an angle between the first input waveguide and the center of the dispersive waveguide array at the first propagation region is not equal to an angle between the second input waveguide and the center of the dispersive waveguide array at the second propagation region.

10. The bi-directional AWG of claim 1, where the difference in angles between the first input waveguide and the center of the dispersive waveguide array at the first propagation region and the second input waveguide and the center of the dispersive waveguide array at the second propagation region is equal to half the angle between two adjacent output waveguides of the first and second plurality of output waveguides.

11. A wavelength division multiplexed (WDM) device comprising:
    at least one of:
       a transmission component comprising:
          an array of laser modules to produce light having different optical WDM wavelengths onto a plurality of optical paths; and
          a multiplexer having a plurality of inputs to receive light from each of the plurality of optical paths and to output an output WDM signal comprising the different optical WDM wavelengths; or
       a receiving component comprising a de-multiplexer to receive an input WDM signal comprising the different optical WDM wavelengths and to output each of the different WDM wavelengths on a separate optical path;
    wherein the at least one of the transmission component or the receiving component includes a bi-directional arrayed waveguide grating (AWG) comprising:
       a first free propagation region;
       a second free propagation region;
       a dispersive waveguide array optically coupling the first and second free propagation regions;
       a first input waveguide coupled to the first free propagation region to input light into the dispersive waveguide array;
       a second input waveguide coupled to the second free propagation region to input light into the dispersive waveguide array;
       a first plurality of output waveguides coupled to the first free propagation region to output light from the dispersive waveguide array received from the first input waveguide; and
       a second plurality of output waveguides coupled to the second free propagation region to output light from the dispersive waveguide array received from the second input waveguide;
       wherein an angle between the first input waveguide in the first free propagation region and a closest output waveguide is larger than an angle between any two output waveguides within the first free propagation region.

12. The WDM device of claim 11, wherein an angle between the second input waveguide in the second free propagation region and a closest output waveguide is larger than an angle between any two output waveguides within the first free propagation region.

13. The WDM device of claim 11, wherein the dispersive waveguide array of the bi-directional AWG is formed, at least partially, from silicon semiconductor material.

14. The WDM device of claim 11, wherein the dispersive waveguide array of the bi-directional AWG is formed, at least partially, from III-V semiconductor material.

15. The WDM device of claim 11, wherein the dispersive waveguide array of the bi-directional AWG is formed, at least partially, from silicon nitride (SiN) material.

16. The WDM device of claim 11, wherein the dispersive waveguide array of the bi-directional AWG comprises a plurality of regions having a different temperature coefficient of refractive index (dn/dT).

17. The WDM device of claim 11, wherein a spacing of the first plurality of waveguides of the bi-directional AWG at the first propagation region and a spacing of the second plurality of waveguides at the second propagation region are equal.

18. The WDM device of claim 11, wherein a free spectral range of the dispersive waveguide array of the bi-directional AWG is greater than a frequency spacing between individual wavelength channels to be separated at the output multiplied by the total number of input and output waveguides connected to the first free propagation region.

19. The WDM device of claim 11, wherein an angle between the first input waveguide and the center of the dispersive waveguide array of the bi-directional AWG at the first propagation region is not equal to an angle between the second input waveguide and the center of the dispersive waveguide array at the second propagation region.

20. The WDM device of claim 11, where the difference in angles between the first input waveguide and the center of the dispersive waveguide array of the bi-directional AWG at the first propagation region and the second input waveguide and the center of the dispersive waveguide array at the second propagation region is equal to half the angle between two adjacent output waveguides of the first and second plurality of output waveguides.

* * * * *